United States Patent
Liu et al.

(10) Patent No.: US 9,262,009 B2
(45) Date of Patent: Feb. 16, 2016

(54) TOUCH DEVICE AND METHOD FOR DETECTING TOUCH POINT THEREOF

(75) Inventors: Jui-Ming Liu, Tainan (TW); Li-Lin Liu, Tainan (TW); Chung-Wen Chang, Tainan (TW); Shen-Feng Tai, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 202 days.

(21) Appl. No.: 13/492,442

(22) Filed: Jun. 8, 2012

(65) Prior Publication Data

US 2013/0328790 A1    Dec. 12, 2013

(51) Int. Cl.
*G06F 3/041* (2006.01)

(52) U.S. Cl.
CPC .................................. *G06F 3/0418* (2013.01)

(58) Field of Classification Search
CPC .............................. G06F 3/041; G06F 3/0418
USPC ........................................................ 345/173
See application file for complete search history.

(56) References Cited

U.S. PATENT DOCUMENTS

| | | | |
|---|---|---|---|
| 8,144,132 B2* | 3/2012 | Chen et al. | 345/174 |
| 8,212,795 B2* | 7/2012 | Henry | 345/179 |
| 8,749,512 B2* | 6/2014 | Westerman et al. | 345/174 |
| 2007/0159467 A1* | 7/2007 | Kim et al. | 345/173 |
| 2010/0117981 A1* | 5/2010 | Chen et al. | 345/174 |
| 2011/0074725 A1* | 3/2011 | Westerman et al. | 345/174 |
| 2012/0044180 A1* | 2/2012 | Matsui et al. | 345/173 |
| 2012/0062474 A1* | 3/2012 | Weishaupt et al. | 345/173 |
| 2012/0092296 A1* | 4/2012 | Yanase et al. | 345/174 |

* cited by examiner

*Primary Examiner* — Aneeta Yodichkas
*Assistant Examiner* — Chineyere Wills-Burns
(74) *Attorney, Agent, or Firm* — J.C. Patents

(57) ABSTRACT

A touch device and method for detecting a touch point thereof are provided. The method includes: detecting a plurality of first touch values, second touch values and third touch values corresponding to a plurality of touch regions of a touch panel, respectively, during a first frame period, a second frame period and a third frame period; performing a value obtaining operation to output a median of the first touch value, the second touch value and the third touch value to which each of the touch regions correspond; and determining a real touch point according a touch threshold and the first touch values, the second touch values and the third touch values outputted by the value obtaining operation.

10 Claims, 2 Drawing Sheets

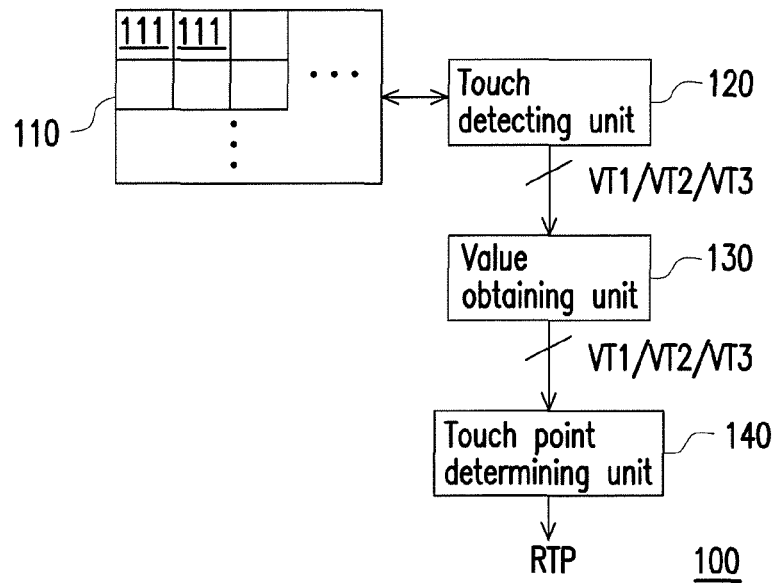
FIG. 1A
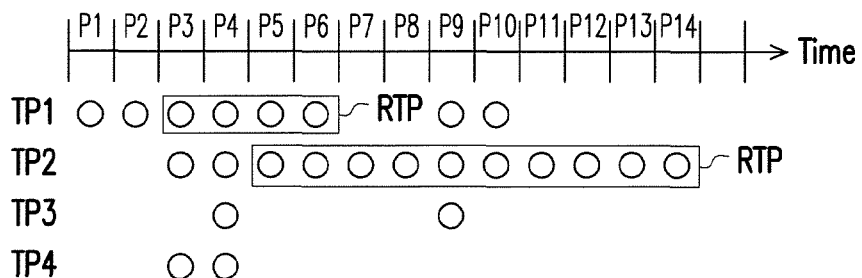
FIG. 1B
FIG. 1C

TOUCH DEVICE AND METHOD FOR DETECTING TOUCH POINT THEREOF

BACKGROUND OF THE INVENTION

1. Field of the Invention

The invention relates to a touch device and a method for detecting a touch point thereof, and more particularly to a touch device which is able to filter out a false touch point and a method for detecting a touch point thereof.

2. Description of Related Art

With a rapid development and application of information technologies, wireless mobile communications, and information home appliances, a touch panel has been introduced as an input device in replacement of a conventional keyboard or a mouse for an electronic device to meet portable, compact, and user-friendly demands. Currently, a touch panel is generally categorized into a resistive touch panel and a capacitive touch panel, wherein the capacitive touch panel is with better sensing effects and thus becomes a main stream product at present.

Since a capacitive touch device is easily affected by circumstances, such as an external voltage provided by an adaptor, a high-frequency interference, a change of temperature, or an electrostatic discharge, and generates a noise, the capacitive touch device generates an abnormal sensing signal (i.e. the noise) which leads to a misjudgment of the electronic device and a waste of power.

SUMMARY OF THE INVENTION

The invention is directed to a touch device and a method of detecting a touch point thereof to filter out a false touch point and obtain a real touch point.

The invention provides the touch device including a touch panel, a touch detecting unit, a value obtaining unit and a touch point determining unit. The touch panel is with a plurality of touch regions. The touch detecting unit is coupled to the touch panel to detect a plurality of touch values to which the touch regions correspond. The value obtaining unit is coupled to the touch detecting unit to receive a plurality of first touch values to which the touch regions correspond during a first frame period, a plurality of second touch values to which the touch regions correspond during a second frame period, and a plurality of third touch values to which the touch regions correspond during a third frame period, and performs a value obtaining operation to output a median of the first touch value, the second touch value and the third touch value to which each of the touch regions corresponds. The touch point determining unit is coupled to the value obtaining unit to determine a real touch point according to a touch threshold and the first touch values, the second touch values and the third touch values outputted by the value obtaining unit.

In an embodiment of the invention, the touch point determining unit determines a touch point according to the touch threshold and the first touch values, the second touch values and the third touch values outputted by the value obtaining unit. When the touch point has been continuously detected for n frame periods, the touch point is determined as the real touch point. When the touch point has not been continuously detected for n frame periods, the touch point is determined as a false touch point, wherein n is a positive integer greater than or equal to 3, and the touch point corresponds to one of the touch regions.

In an embodiment of the invention, the touch point determining unit determines the touch point according to the touch threshold and the first touch values, the second touch values and the third touch values outputted by the value obtaining unit. When a first sum of the touch values of the touch region to which the touch point corresponds and four adjacent regions thereof is greater than or equal to a touch point determining value, the touch point determining unit determines the touch point as the real touch point. When the first sum of the touch values is less than the touch point determining value, the touch point determining unit determines the touch point as the false touch point.

In an embodiment of the invention, the value obtaining unit performs the value obtaining operation when the touch device receives an external voltage provided by an adaptor, and the value obtaining unit does not perform the value obtaining operation and directly transmits the received first touch values, the received second touch values, and the received third touch values when the touch device does not receive the external voltage provided by the adaptor.

The invention further provides a method for detecting a touch point of a touch device, wherein the method includes: detecting a plurality of first touch values to which a plurality of touch regions of a touch panel correspond during a first frame period, a plurality of second touch values to which the touch regions correspond during a second frame period, and a plurality of third touch values to which the touch regions correspond during a third frame period; performing a value obtaining operation to output a median of the first touch value, the second touch value, and the third touch value to which each the touch regions corresponds; and determining a real touch point according to a touch threshold and the first touch values, the second touch values, and the third touch values outputted by the value obtaining operation.

In an embodiment of the invention, determining the touch point according to the touch threshold and the first touch values, the second touch values and the third touch values outputted by the value obtaining operation includes: determining a touch point according to the touch threshold and the first touch values, the second touch values, and the third touch values outputted by the value obtaining operation, wherein the touch point corresponds to one of the touch regions; when the touch point has been continuously detected for n frame periods, the touch point is determined as the real touch point; when the touch point has not been continuously detected for n frame periods, the touch point is determined as a false touch point, wherein n is a positive integer greater than or equal to 3.

In an embodiment of the invention, the touch point corresponds to the completely identical, partially identical, or completely different touch regions in different frame periods.

In an embodiment of the invention, determining the real touch point according to the touch threshold and the first touch values, the second touch values, and the third touch values outputted by the value obtaining operation includes: determining a touch point according to the touch threshold and the first touch values, the second touch values, and the third touch values outputted by the value obtaining operation; when a first sum of the touch values of the touch region to which the touch point corresponds and four adjacent regions thereof is greater than or equal to a touch point determining value, the touch point is determined as the real touch point; when the first sum of the touch values is less than the touch point determining value, the touch point is determined as a false touch point.

In an embodiment of the invention, the touch panel is a capacitive touch panel, and the touch point determining value is to multiply a second sum of the touch values by a ratio which is greater than or equal to 0.7, wherein the second sum of the touch values is a sum of the touch values of a touch region touched by a copper stick with a diameter of 5 mm and four adjacent touch regions thereof.

In an embodiment of the invention, the method of detecting the touch point of the touch device further includes: performing the value obtaining operation when the touch device receives an external voltage provided by an adaptor, and stopping performing the value obtaining operation and determining the real touch point according to the touch threshold and the first touch values, the second touch values, or the third touch values when the touch device does not receive an external voltage provided by the adaptor.

Based on the above, the touch device and the method of detecting the touch point thereof of the embodiments of the invention are through filtering out a maximum value and a minimum value of the first touch value, the second touch value, and the third touch value corresponding to a touch region in different frame periods, and thus the touch point detected because of an influence of noises is filtered out, and the real touch point is obtained.

In order to make the aforementioned features and strengths of the invention more comprehensible, embodiments accompanying figures are described in detail below.

BRIEF DESCRIPTION OF THE DRAWINGS

The accompanying drawings constituting a part of this specification are incorporated herein to provide a further understanding of the invention. Here, the drawings illustrate embodiments of the invention and, together with the description, serve to explain the principles of the invention.

FIG. 1A is a schematic diagram of a system of a touch device according to an embodiment of the invention.

FIG. 1B is a schematic diagram of detecting a touch point of a touch panel according to an embodiment of the invention.

FIG. 1C is a schematic diagram of detecting a touch point of a touch panel according to another embodiment of the invention.

DESCRIPTION OF EMBODIMENTS

Figure 2:
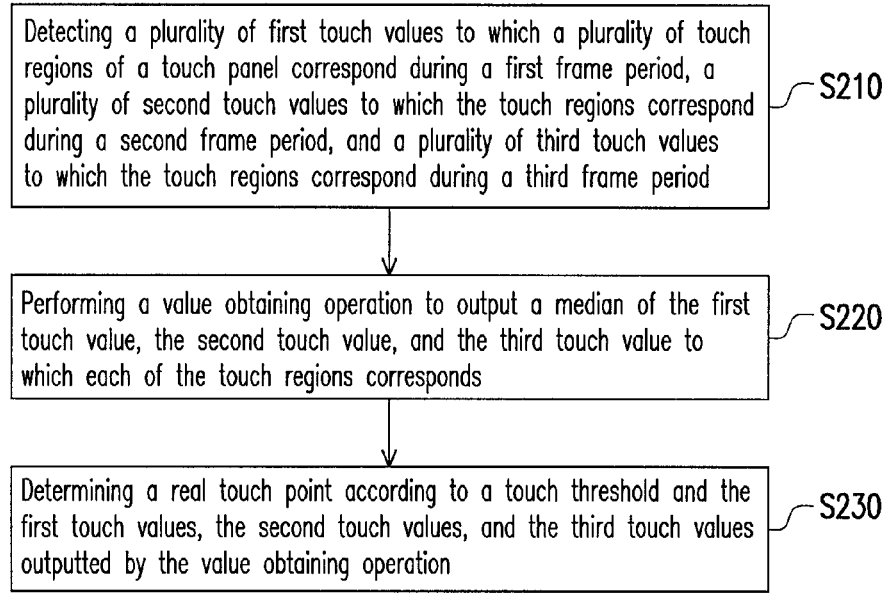
FIG. 2 is a flow diagram illustrating a method of a touch device detecting a touch point according to an embodiment of the invention.

FIG. 1A is a schematic diagram of a system of a touch device according to an embodiment of the invention. Referring to FIG. 1A, in the present embodiment, a touch device 100 includes a touch panel 110, a touch detecting unit 120, a value obtaining unit 130, and a touch point determining unit 140, wherein the touch panel 110 is, for example, a capacitive touch panel. The touch panel 110 has a plurality of touch regions 111. The touch detecting unit 120 is coupled to the touch panel 110 to detect a plurality of touch values (such as VT1, VT2, or VT3) to which the touch regions 111 correspond, wherein the touch regions 111 correspond to a plurality of first touch values VT1 during a first frame period, to a plurality of second touch values VT2 during a second frame period, and to a plurality of third touch values VT3 during a third frame period, and the first frame period, the second frame period, and the third frame period are able to be three continuous frame periods.

The value obtaining unit 130 is coupled to the touch detecting unit 120 to receive the first touch values VT1, the second touch values VT2, and the third touch values VT3. Furthermore, the value obtaining unit 130 performs a value obtaining operation to output a median of the first touch value VT1, the second touch value VT2, and the third touch value VT3 to which each of the touch regions 111 corresponds, that is, to filter out a maximum value and a minimum value of the first touch value VT1, the second touch value VT2, and the third touch value VT3 to which each of the touch regions 111 corresponds.

The touch point determining unit 140 coupled to the value obtaining unit 130 determines a real touch point RTP according to the first touch values VT1, the second touch values VT2, and the third touch values VT3 outputted by the value obtaining unit 130. In other words, the touch point determining unit 140 determines a touch point on the touch panel 110 according to a touch threshold and the first touch values VT1, the second touch values VT2, and the third touch values VT3 outputted by the value obtaining unit 130, and determines whether the touch point is a false touch point or the real touch point RTP according to at least a method for determining a touch point (which is explained later), wherein the real touch point RTP is outputted to show that the touch panel 110 is actually touched.

FIG. 1B is a schematic diagram of detecting a touch point of a touch panel according to an embodiment of the invention. Referring to FIGS. 1A and 1B, in the present embodiment, the touch regions 111 of the touch panel 110 are arranged in, for example, a 10*10 matrix, and touch values (i.e. the values shown in grids) of each of the touch regions 111 are, for example, the first touch values VT1, the second touch values VT2, and the third touch values VT3 outputted by the value obtaining unit 130; in other words, the touch values shown in FIG. 1B are not sure to be touch values obtained by the touch detecting unit 120 during a same frame period, but are sure to be obtained by the touch point determining unit 140 from the value obtaining unit 130 during the same frame period.

As shown in FIG. 1B, herein, the touch threshold is assumed to be 20, and the touch regions 111 with touch values greater than the touch threshold are regarded as touched touch regions 111 (as shown in grey grids). Generally, the touched touch regions 111 corresponding to the same touch point are adjacent to one another; as shown in FIG. 1B, the touched touch regions 111 are divided into four blocks (which means there are four touch points), and in each of the blocks, the touch regions 111 with highest touch values are the touch points, and thus four touch points W1-W4 shown in FIG. 1B and the corresponding touch regions 111 thereof are determined.

Usually, the touch values that are actually affected by touch are higher, and the touch values that are affected by noises are lower; therefore, a touch point determining value is set to distinguish the real touch point RTP from the false touch point, wherein the touch point determining value is compared with the touch values the touch points W1-W4 correspond to, respectively. Take the touch values shown in FIG. 1B as an example, and the touch point determining value is, for example, 40; when the touch points W1 and W3 are outputted because of being considered the real touch points RTP, the touch points W2 and W4 are filtered out because of being considered the false touch points.

In addition, an touch action generally affects the touch regions 111 to which the touch points correspond and the adjacent touch regions 111 thereof; therefore, the touch values of the touch regions 111 to which the touch points (such as W1-W4) correspond and the four adjacent touch regions 111 thereof are taken into consideration together; that is, whether the touch point is the real touch point RTP is determined by comparing a sum (corresponding to a first sum of the touch values) of the touch values with the touch point determining value, which thereby improves a precision of determining the real touch point RTP, wherein the sum of the touch values is a sum of the touch values of the touch regions 111 to which the touch points (such as W1-W4) correspond and the touch values of the four adjacent touch regions 111 thereof.

In the present embodiment, when the touch panel 110 is a capacitive touch panel, the touch point determining value of the touch point is to multiply a sum (corresponding to a second sum of the touch values) of the touch values by a ratio which is set to be greater than or equal to 0.7, and the sum of the touch values is a sum of the touch values of the touch region 111 touched by a copper stick with a diameter of 5 mm and the four adjacent touch regions 111 thereof. The sum of the touch values of the touch region 111 touched by the copper stick with a diameter of 5 mm and the four adjacent touch regions 111 thereof is assumed to be 160, and the ratio is set as 0.7, and the touch point determining value is 112, wherein the sum is variable with a design of the touch panel 110, and the above is an example for explanation.

According to FIG. 1B, since the sum of the touch values of the touch region 111 to which the touch point W1 corresponds and the four adjacent touch regions 111 thereof is 196 (i.e. 60+35+44+31+26), which is greater than the touch point determining value 112, the touch point W1 is considered the real touch point RTP. Since the sum of the touch values of the touch region 111 to which the touch point W2 corresponds and the four adjacent touch regions 111 thereof is 77 (i.e. 33+24+4+14+2), which is less than the touch point determining value 112, the touch point W2 is considered the false touch point. Since the sum of the touch values of the touch region 111 to which the touch point W3 corresponds and the four adjacent touch regions 111 thereof is 148 (i.e. 55+2+9+46+36), which is greater than the touch point determining value 112, the touch point W3 is considered the real touch point RTP. Since the sum of the touch values of the touch region 111 to which the touch point W4 corresponds and the four adjacent touch regions 111 thereof is 57 (i.e. 27+2+14+7+7), which is less than the touch point determining value 112, the touch point W4 is considered the false touch point.

In addition, when the sum of the touch values of the touch regions 111 to which the touch points correspond and the touch values of the four adjacent touch regions 111 thereof is equal to the touch point determining value, the touch point is considered the real touch point RTP; however, the embodiments of the invention are not limited thereto, and designs may be made by persons skilled in the art.

FIG. 1C is a schematic diagram of determining a touch point of a touch panel according to another embodiment of the invention. Referring to FIGS. 1A and 1C, in the present embodiment, a touch point determining unit 140 is able to determine a touch point (such as TP1-TP4) according to a touch threshold and first touch values VT1, second touch values VT2, and third touch values VT3 outputted by a value obtaining unit 130, wherein FIG. 1B may be referred to for a way of determining the touch point, but the embodiments of the invention are not limited thereto.

Generally, since an operation speed of a touch device 100 is much higher than a movement of people, thus a detected touch point (such as TP1-TP4) affected by touch generally continuously appears in a plurality of frame periods; however, a detected touch point (such as TP1-TP4) affected by noises usually appears suddenly in some discontinuous frame periods; in other words, the detected touch point (such as TP1-TP4) affected by the noises usually does not appear in the plurality of continuous frame periods.

Based on the above, whether the touch point is a real touch point RTP or a false touch point is able to be determined according to whether the touch point continuously appears in n frame periods or not, wherein n is set as a positive integer which is greater than or equal to 3. In other words, when the touch point (such as TP1-TP4) has been continuously detected for n frame periods (which means the touch point continuously appears in n frame periods), then the touch point is determined as the real touch point; when the touch point has not been continuously detected for n frame periods (which means the touch point does not continuously appear in n frame periods), the touch point is determined as the false touch point, wherein each touch point (such as TP1-TP4) is able to be determined through counting numbers of continuously detected frame periods, that is, to plus one to the counting number when the touch point is detected in the frame period and to reset the counting number to zero when the touch point is not detected in the frame period, which may be changed by persons skilled in the art.

In the present embodiment, n is assumed to be 3, and a circle represents that any one of the touch points TP1-TP4 is detected. According to FIG. 1C, during frame periods P1-P6, the touch point TP1 is continuously detected by the touch point determining unit 140, and thus the touch point TP1 detected in the frame periods P3-P6 is considered the real touch point RTP. Moreover, although the touch point TP1 is detected during frame periods P9 and P10, since the condition that the touch point is detected in 3 continuous frame periods is not met, the touch point TP1 detected during the frame periods P9 and P10 is not considered the real touch point RTP; that is, TP1 is considered the false touch point. Likewise, the touch point TP2 during frame periods P5-P14 is considered the real touch point RTP; the touch point TP3 detected during frame periods P4 and P9 is considered the false touch point; the touch point TP4 detected during frame periods P3 and P4 is considered the false touch point.

According to FIG. 1B, each of the touch points (such as TP1-TP4) corresponds to one of the touch regions 111, respectively, but according to ways of touch operation, the touch points (such as TP1-TP4) correspond to completely identical, partially identical, or completely different touch regions in different frame periods. In other words, when a way of the touch operation is clicking or pressing, the touch regions that the touch points (such as TP1-TP4) correspond to in different frame periods are identical; when the way of the touch operation is sliding, the touch regions that the touch points (such as TP1-TP4) correspond to in different frame periods are completely different; when the way of the touch operation is a combination of clicking or pressing and sliding, the touch regions that the touch points (such as TP1-TP4) correspond to in different frame periods are partially identical.

In the embodiments of the invention, the embodiment of FIG. 1A may be implemented with the embodiments of FIG. 1B or 1C, or the embodiment of FIG. 1A may be implemented with the embodiments of FIGS. 1B and 1C at the same time, which may be designed by persons skilled in the art. That is, in an embodiment of the invention, the real touch point RTP in the embodiment of FIG. 1A is determined as the real touch point RTP by the embodiment of FIG. 1B; in an embodiment of the invention, the real touch point RTP in the embodiment of FIG. 1A is determined as the real touch point RTP by the embodiment of FIG. 1C; and in an embodiment of the invention, the real touch point RTP in the embodiment of FIG. 1A is determined as the real touch RTP by the embodiments of both FIGS. 1B and 1C.

Generally, when the touch panel 110 is a capacitive touch panel, the touch device 100 is easily affected by an external voltage provided by an adaptor and produces a noise. Thus, in an embodiment of the invention, when the touch device 100 does not receive the external voltage provided by the inverter, the noise inside the touch device 100 is relatively reduced; therefore, one or part of filtering methods taught in FIGS. 1A to 1C may be turned off selectively to synchronously reduce an influence of filtering out the noise on the touch and operation effects.

As taught by the embodiments of FIGS. 1A to 1C, filtering out a maximum value and a minimum value of the first touch value VT1, the second touch value VT2, and the third touch value VT3 corresponding to each of the touch regions 111 is most influential on detecting the touch point; that is, performing a value obtaining operation influences most on detecting the touch point. Thus, when the touch device 100 does not receive the external voltage provided by the inverter, the value obtaining unit 130 stops the value obtaining operation, which means that the value obtaining unit 130 directly transmits the received first touch values VT1, the received second touch values VT2, and the received third touch values VT3; when the touch device 100 receives the external voltage provided by the inverter, the value obtaining unit 130 performs the value obtaining operation to filter out the maximum value and the minimum value of the first touch value VT1, the second touch value VT2, and the third touch value VT3 corresponding to a touch region 111. Furthermore, when the value obtaining unit 130 stops the value obtaining operation, the touch value shown in FIG. 1B may be the touch value obtained by the touch detecting unit 120 in the same frame period.

FIG. 2 is a flow diagram illustrating a method of a touch device detecting a touch point according to an embodiment of the invention. Referring to FIG. 2, in the present embodiment, the method of detecting the touch point includes: detecting a plurality of first touch values to which a plurality of touch regions of the touch device correspond in a first frame period, a plurality of second touch values to which the touch regions correspond in a second frame period, and a plurality of third touch values to which the touch regions correspond in a third frame period (step S210). Then, a value obtaining operation is performed to output a median of the first touch value, the second touch value, and the third touch value to which each of the touch regions corresponds (step S220). Then, a real touch point is determined according to a touch threshold and the first touch values, the second touch values, and third touch values outputted by the value obtaining operation (step S230). For details of the above steps, the embodiments of FIGS. 1A to 1C may be referred to, and thus descriptions are not repeated herein.

Figure 3:
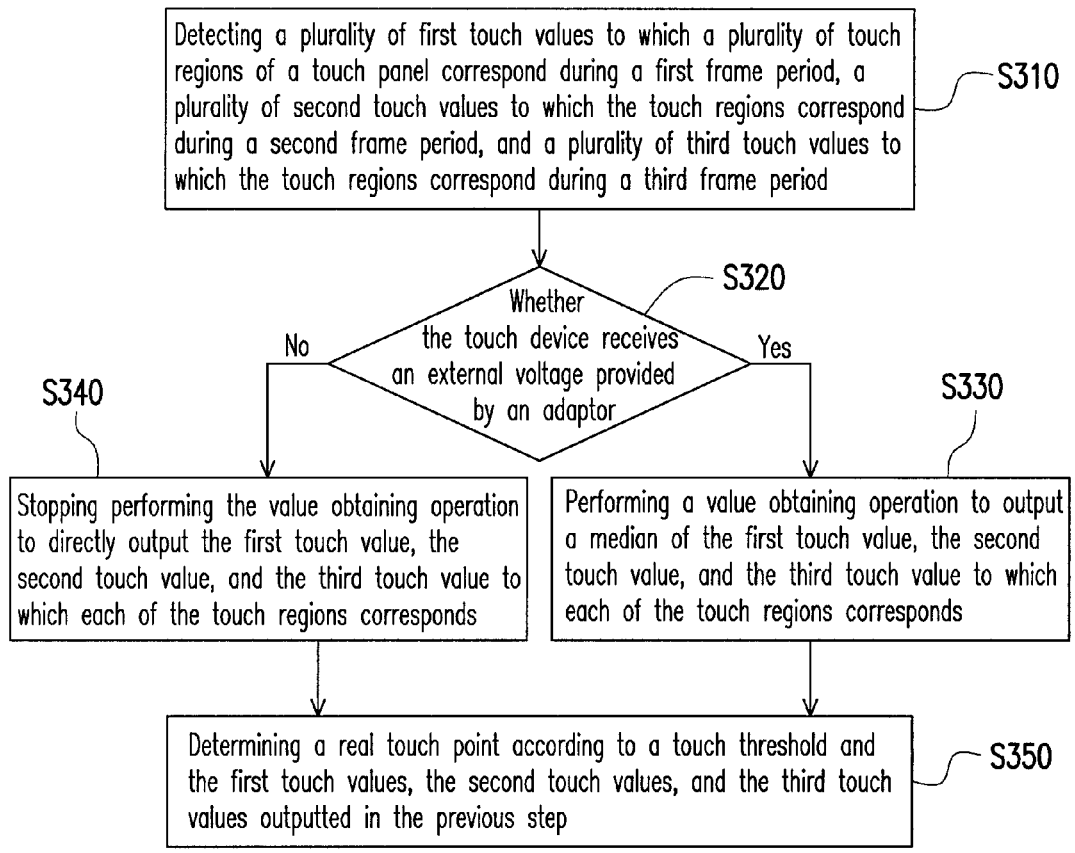
FIG. 3 is a flow diagram illustrating a method of a touch device detecting a touch point according to another embodiment of the invention.

FIG. 3 is a flow diagram illustrating a method of a touch device detecting a touch point according to another embodiment of the invention. Referring to FIG. 3, in the present embodiment, steps S310 and S330 are similar to the steps S210 and S220 and thus are not repeated herein; furthermore, a step S320 is performed after the step S310. In the step S320, whether the touch device receives an external voltage provided by an adaptor is determined. When the touch device receives the external voltage provided by the adaptor, a result that the step S320 determines is "yes," and then the step S330 is performed; when the touch device does not receive the external voltage provided by the adaptor, the result that the step S320 determines is "no," and then a step S340 is performed. In the step S340, a value obtaining operation is stopped from performing to directly output first touch value, second touch value, and third touch value to which each of the touch regions corresponds. A step S350 is performed after the steps S330 and S340. In the step S350, a real touch point is determined according to a touch threshold and the first touch values, the second touch values, and third touch values outputted in the previous step. For details of the above steps, the embodiments of FIGS. 1A to 1C may be referred to, and thus descriptions are not repeated herein.

Based on the above, the touch device and the method of detecting the touch point thereof in the embodiments of the invention are to obtain the real touch point by filtering out the maximum value and the minimum value of the first, the second, and the third touch value corresponding to a touch region in different frame periods, and thus to filter out part of the touch points detected because of the influence of the noise. In addition, according to whether the touch point has been detected continuously for n frame periods and/or the sum of the touch values of the touch region to which the touch point corresponds and the four adjacent touch regions thereof, whether the detected touch point is the real touch point or not is determined. Furthermore, when the touch device does not receive the external voltage provided by the adaptor, filtering out the maximum value and the minimum value of the first, the second, and the third touch value corresponding to a touch region in different frame periods is stopped accordingly.

Although the invention has been described with reference to the above embodiments, it will be apparent to one of ordinary skill in the art that modifications and variations to the invention may be made without departing from the spirit and scope of the invention. Accordingly, the protection scope of the invention is defined by the appended claims.

What is claimed is:

1. A touch device, comprising:
   a touch panel with a plurality of touch regions;
   a touch detecting unit coupled to the touch panel to detect a plurality of touch values to which the touch regions correspond;
   a value obtaining unit coupled to the touch detecting unit to receive a plurality of first touch values to which the touch regions correspond during a first frame period, a plurality of second touch values to which the touch regions correspond during a second frame period, and a plurality of third touch values to which the touch regions correspond during a third frame period, and to perform a value obtaining operation for each of the touch regions to output a median of the first touch value, the second touch value and the third touch value; and
   a touch point determining unit coupled to the value obtaining unit to determine a real touch point according to a touch threshold and the median of the first touch values, the second touch values and the third touch values outputted by the value obtaining unit,
   wherein the touch point determining unit determines a touch point according to the touch threshold and the medium of the first touch values, the second touch values and the third touch values outputted by the value obtaining unit, and when a first sum is equal to or greater than a touch point determining value, the touch point is determined as the real touch point by the touch point determining unit, and when the first sum is less than the touch point determining value, the touch point is determined as a false touch point, where the first sum is a sum of the touch values of a touch region to which the touch point corresponds and four adjacent touch regions thereof.

2. The touch device of claim 1, wherein when the touch point has been continuously detected for n frame periods, the touch point is determined as the real touch point by the touch point determining unit, and when the touch point has not been continuously detected for n frame periods, the touch point is determined as a false touch point, wherein n is a positive integer greater than or equal to 3, and the touch point corresponds to one of the touch regions.

3. The touch device of claim 2, wherein the touch point in different frame periods corresponds to the completely identical, partially identical or completely different touch regions.

4. The touch device of claim 1, wherein the touch panel is a capacitive touch panel, and the touch point determining value is to multiply a second sum of the touch values by a ratio which is greater than or equal to 0.7, wherein the second sum of the touch values is a sum of the touch values of a touch region touched by a copper stick with a diameter of 5 mm and four adjacent touch regions thereof.

5. The touch device of claim 1, wherein when the touch device receives an external voltage provided by an inverter, the value obtaining unit performs the value obtaining operation, and when the touch device does not receive the external voltage provided by the inverter, the value obtaining unit does not perform the value obtaining operation and directly transmits the received first touch values, the received second touch values, and the received third touch values.

6. A method of detecting a touch point of a touch device, comprising:

detecting a plurality of first touch values to which a plurality of touch regions of a touch panel correspond during a first frame period, a plurality of second touch values to which the touch regions correspond during a second frame period, and a plurality of third touch values to which the touch regions correspond during a third frame period;

performing a value obtaining operation for each of the touch regions to output a median of the first touch value, the second touch value and the third touch value; and determining a real touch point according to a touch threshold and the median of the first touch values, the second touch values, and the third touch values outputted by the value obtaining operation, comprises:

determining a touch point according to the touch threshold and the median of the first touch values, the second touch values, and the third touch values outputted by the value obtaining operation;

determining the touch point as the real touch point when a first sum is greater than or equal to a touch point determining value, where the first sum is a sum of the touch values of a touch region to which the touch point corresponds and four adjacent touch regions thereof; and determining the touch point as a false touch point when the first sum of the touch values is less than the touch point determining value.

7. The method of detecting the touch point of the touch device of claim 6, wherein the step of determining the real touch point according to the touch threshold and the first touch values, the second touch values, and the third touch values outputted by the value obtaining operation further comprises:

determining the touch point as the real touch point when the touch point has been continuously detected for n frame periods, wherein n is a positive integer greater than or equal to 3; and determining the touch point as a false touch point when the touch point has not been continuously detected for n frame periods.

8. The method of detecting the touch point of the touch device of claim 7, wherein the touch point corresponds to the completely identical, partially identical, or completely different touch regions in different frame periods.

9. The method of detecting the touch point of the touch device of claim 6, wherein the touch panel is a capacitive touch panel, and the touch point determining value is to multiply a second sum of the touch values by a ratio which is greater than or equal to 0.7, wherein the second sum of the touch values is a sum of the touch values of a touch region touched by a copper stick with a diameter of 5 mm and four adjacent touch regions thereof.

10. The method of detecting the touch point of the touch device of claim 6, further comprising:

when the touch device receives an external voltage provided by an adaptor, performing the value obtaining operation; and when the touch device does not receive the external voltage provided by the adaptor, stopping performing the value obtaining operation and determining the real touch point according to the touch threshold and the first touch values, the second touch values, or the third touch values.

* * * * *